United States Patent Office 3,300,224
Patented Jan. 24, 1967

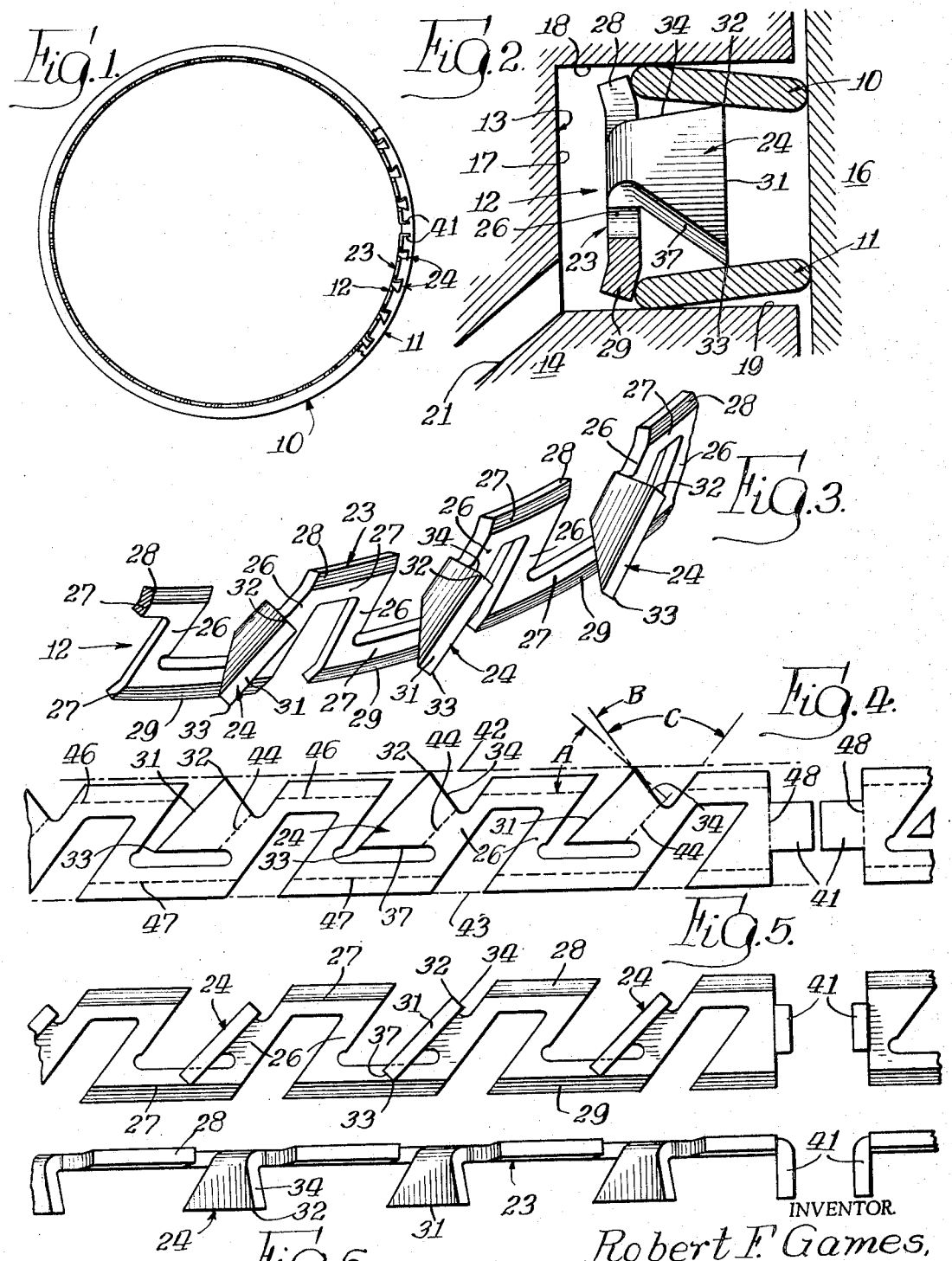

3,300,224
SPACER-EXPANDER FOR PISTON RING ASSEMBLY
Robert F. Games, Hagerstown, Ind., assignor, by mesne assignments, to Dana Corporation, Toledo, Ohio, a corporation of Virginia
Filed June 14, 1963, Ser. No. 288,031
12 Claims. (Cl. 277—139)

This invention relates to piston rings, and more particularly to a novel piston ring assembly for an internal combustion engine.

Piston ring assemblies adapted to be installed in a piston ring groove have heretofore been provided, comprising a pair of annular cylinder engaging rails and a combination spacer-expander for holding the rails in axially spaced relation in the groove and for forcing the rails radially outwardly against the cylinder wall. Such spacer-expanders are circumferentially expansible, and the spring action thereof is attained by portions which, at least in part, extend radially of the piston.

Piston ring assemblies of the foregoing character have been widely used in the engines of American made automobiles. However, it has been found that this type of assembly is not suitable for use in the engines of many types of automobiles manufactured outside the United States, because these engines frequently have relatively small bores and consequently relatively shallow piston ring grooves. The radial dimension of a ring assembly of the character described above cannot be reduced to fit in the shallower groove of such engines and still have a suitable spring rate for the spacer-expander.

Accordingly, it is an object of this invention to provide a novel piston ring assembly including a spacer-expander and a pair of annular rails, which is suitable for use in an engine having relatively shallow piston ring grooves.

A further object is to provide a novel piston ring assembly of the foregoing character which avoids formation of carbon tending to unitize the spacer-expander and the rails.

It is another object to provide a novel spacer-expander of the foregoing character, which has a relatively small radial dimension and nevertheless a satisfactory spring rate.

Still another object is to provide a novel spacer-expander of the foregoing character, which further supports both rails equally at points spaced outwardly from their inner peripheries.

Other objects and advantages of the invention will become apparent from the following description taken in conjunction with the accompanying figures of the drawing, in which:

FIG. 1 is a plan view of a piston ring assembly embodying the invention;

FIG. 2 is an enlarged radial sectional view showing the assembly in a groove of a piston and confined within a cylinder;

FIG. 3 is an enlarged fragmentary perspective view of the spacer-expander;

FIG. 4 is a fragmentary view of a strip of material from which the spacer-expander is made;

FIG. 5 is a view showing the strip of FIG. 4 after certain operations have been performed thereon.

FIG. 6 is another view of the strip in the condition shown in FIG. 5.

In general, piston ring assembly embodying the invention is adapted to be installed in a piston ring groove and comprises a spacer-expander and a pair of annular cylinder engaging rails. The spacer-expander is adapted to hold the rails in axially spaced relation and also to force the rails outwardly against the cylinder wall. The spacer-expander comprises a spring structure and a plurality of radially extending tabs. The spring structure includes a plurality of circumferentially spaced arms and a plurality of connecting members which extend circumferentially and connect the arms together. The members are connected to the ends of the arms and are located alternately at the upper and lower edges of the spring structure.

The tabs are circumferentially spaced and are formed on certain of the arms preferably alternate arms. Further, the tabs are preferably so formed that the upper and lower corners of each tab at its outer end are spaced equal axial distances from the upper and lower edges of the spring structure, and the two corners are spaced equal radial distances outwardly from the spring member.

The connecting members of the spring structure engage the inner peripheries of the two rails and force them outwardly against the cylinder wall, and axially against the sides of the groove and the upper and lower corners of the tabs engage the inner sides of the rails and hold the rails in axially spaced relation.

FIGS. 1 and 2 show a piston ring assembly comprising a pair of annular rails 10 and 11, and a comibned spacer-expander 12. The assembly is adapted to be positioned within an annular groove 13 (FIG. 2) formed within a piston 14, and confined within a cylinder 16 of an internal combustion engine. The groove 13 has a bottom 17, and upper and lower sides 18 and 19, and a passage 21 may be formed in the piston 14 leading from the bottom 17 of the groove 13 adjacent the lower side 19 to the interior of the piston for the purpose of draining oil from the groove 13.

Each rail 10 and 11 is preferably made from a flat strip of metal such as spring steel, and it is provided with a gap to permit it to expand radially. Each rail is resilient and, by itself, exerts some outward pressure against the wall of the cylinder 16.

The spacer-expander 12 comprises a spring structure 23 for forcing the rails outwardly and axially and a plurality of tabs 24 for supporting the rails (FIGS. 2 and 3). The spring structure 23 comprises a plurality of circumferentially spaced arms 26 which slant axially and circumferentially. The arms 26 are connected together by a plurality of circumferentially extending connecting members 27, the members 27 being positioned alternately at the upper and lower edges of the spring structure. Preferably, the connecting members 27 are bent to slant axially and inwardly along the upper and lower edges of the spring structure to form upper and lower shoulder portions 28 and 29 which engage the inner peripheries of the rails 10 and 11. Thus, the rails are forced outwardly by the spring structure 23, and the inner peripheries of the rails are forced axially against the adjacent sides of the groove.

The tabs 24 are adapted to support the rails 10 and 11 at points spaced outwardly from inner peripheries, and for this purpose extend radially outward from certain of the arms 26, preferably alternate arms. Each tab has a pair of corners adapted to engage the inner sides of the respective rails. By utilizing corners of the tabs to engage the rails, chance of carbon formation at the points of engagement is avoided, and hence chance of the spacer-expander and rails becoming unitized is eliminated. Thus, the outer edge, indicated at 31 (FIG. 2) of each tab has its upper corner 32 and its lower corner 33 equally spaced radially from the spring structure 23, and the axial distance from the upper corner 32 of each tab 24 to the upper edge of the spring structure 23 is preferably equal to the axial distance from the corner 33 of each tab 24 to the lower edge of the spring structure 23. If desired, the corners 32 and 33 of the tabs 24 may be substantially radially aligned with the bend lines forming the shoulder portions 28 and 29 of the spring structure 23. The upper corner 32 of each tab is formed by the intersection of its outer edge 31, its upper edge indicated at 34 and one face of the strip from which it is formed, and the lower corner 33 is formed by its outer edge 31, its lower edge indicated at 37, and the other face of the strip (FIGS. 4 and 5).

At each end of the spring structure 23 is formed a radially outward extending abutment 41 (FIG. 1). When the ends of the spring structure are brought together, the two members 41 abut each other so that, when the piston with the ring assembly is placed in the cylinder 16, compression of the spring structure will occur.

The spacer-expander 12 is preferably formed from a flat strip of metal which is punched to the form shown in FIG. 4. The upper and lower longitudinal edges of the strip before punching are shown by the dash-dot lines 42 and 43. After punching, the strip is bent along the dashed lines 44 to form the tabs 24, along the dashed lines 46 and 47 to form the upper and lower shoulder portions 28 and 29, the lines 48 to form the end abutments 41. After the strip has been bent into a generally cylindrical configuration the upper and lower edges of the spring structure 23 lie in generally parallel radial planes, and the tabs 24 lie in planes extending obliquely to said parallel radial planes, FIG. 4 shows the spacer-expander after the punching operation, and FIGS. 5 and 6 show the spacer-expander after the bending operations have been completed.

The arms 26 of the spring structure 23 are formed with a circumferential and axial slant so that the arms will have sufficient length to provide the desired spring rate. Further, the tabs 24 are so shaped and the bend lines 44 are so located that, after the tabs have been bent outwardly, the upper and lower corners 32 and 33 will be spaced equal axial distances from the upper and lower edges of the spring structure. Before bending (FIG. 4) the lower edge 37 of each tab 24 is preferably substantially parallel to the bend line 47 and parallel to the lower edge 43 of the strip, and the bend line 44 for each tab 24 is at an angle relative to the arms 26 of the spring structure. Also, the bend line 44 is parallel to the outer edge 31 of each tab. Further, for each tab, the distance between the bend line 44 and the outer edge 31 is determinative of the radial width of the tab 24 and, consequently, of the spacer-expander, and may be varied for various sizes of piston ring grooves. After this distance is determined, the angle between the bend line 44 and the length of the strip is preferably made such that, after bending the tab, corner 33 will be substantially radially aligned with the bend line 47 for the lower shoulder portion 29 as shown in FIGS. 2 and 5. Once the angle and the location of the bend lines 44 for the tabs 24 have been determined, and the distance from the bend line 44 to the outer edge 31 of each tab has been determined, the upper edge 34 of each tab 24 is preferably located such that the upper corner 32 of each tab 24 will be radially aligned with the bend line 46 for the upper tab portion 28 after the bending operation, as shown in FIGS. 2 and 5.

As the depth of the piston ring groove decreases, the radial width of the rails should be decreased and also the radial width of the spacer-expander. With the present construction of the spacer-expander, the radial width thereof may be readily decreased independently of the spring structure merely by decreasing the radial extent of the tabs 24. Such radial width may be varied by increasing the angle (indicated by a letter A in FIG. 4) between a line lengthwise of the strip and a line normal to the bend line 44 of a tab 24 before the strip is bent. There is also an increase in the angle (indicated by the letter B) between the upper edge 34 of each tab 24 and a line normal to the bend line 44 of the tab, and there is a decrease in the angle (indicated by the letter C) between the upper edge 34 of each tab member 24 and the arms 26 of the spring structure.

I claim:
1. A piston ring assembly adapted to be installed in an annular groove formed in a piston of an internal combustion engine, comprising a generally cylindrical spacer-expander having upper and lower sides, and a pair of annular cylinder engaging rails, said spacer-expander comprising a plurality of circumferentially spaced arms which slant axially and circumferentially, a plurality of circumferentially extending members connecting said arms together, each connecting member connecting a pair of arms, said conecting members being located alternately along the upper and lower sides of said spacer-expander, the upper and lower sides of said spacer-expander lying in generally parallel radial planes, and a plurality of tabs formed integrally at their radially inner ends with certain of said arms and extending substantially radially outward from said arms to terminate in radially outer ends, each of said radially extending tabs lying in a plane extending obliquely to said parallel radial planes and being wider at its said radially outer end than at its said radially inner end to provide upper and lower corners on said outer end thereof, said corners being spaced inwardly from said parallel radial planes, said connecting members engaging the inner peripheries of said rails and forcing said rails outwardly against said cylinder, and the upper and lower corners on each tab engaging the inner sides of their associated rails and holding said rails in axially spaced relation.

2. A piston ring assembly as in claim 1, wherein said upper and lower corners of each of said tabs are spaced substantially equal axial distances from the upper and lower sides of said spacer-expander.

3. A piston ring assembly as in claim 2, wherein each of said connecting members includes a shoulder portion which slants axially and radially inward from a circumferential bend line, and said upper and lower corners of said tabs are substantially radially aligned with said bend lines.

4. A piston ring assembly as in claim 1, wherein said upper and lower corners of said tabs are spaced substantially equal radial distances from said connecting members.

5. A generally cylindrical spacer-expander for a piston ring assembly including a pair of annular rails, said assembly being adapted to be installed in an annular groove formed in a piston of an internal combustion engine, said spacer expander having upper and lower sides and comprising a plurality of circumferentially spaced arms which slant axially and circumferentially, a plurality of circumferentially extending members connecting said arms together at their ends, said connecting members being located alternately at the upper and lower sides of said spacer-expander and being adapted to engage the inner peripheries of said rails and force said rails radially outward, the upper and lower sides of said spacer-expander lying in generally parallel radial planes, and a plurality of tabs joined at their radially inner ends with said slanted arms and extending radially outwardly from their associated arms to terminate in radially outer ends, each of said radially extending tabs lying in a plane extending obliquely to said parallel radial planes and being wider at its said radial outer end than at its said radial inner end to provide upper and lower corners on said outer end thereof, said corners being spaced inwardly from said parallel radial planes, the upper and lower corners on said tabs being adapted to engage the inner sides of said rails to hold said rails in axially spaced relation.

6. A spacer-expander as in claim 5, wherein said upper and lower corners of each of said tabs are spaced substantially equal axial distances from the upper and lower sides of said spacer-expander.

7. A spacer-expander as in claim 6, wherein each of said connecting members is bent along a circumferential line to slant axially and radially inward and said upper and lower corners of said tabs are substantially radially aligned with said circumferential lines of bend.

8. A spacer-expander as in claim 5, wherein said upper and lower corners of said tabs are spaced substantially equal radial distances from said connecting members.

9. A generally cylindrical spacer-expander for a piston ring assembly including a pair of annular rails, said assembly being adapted to be installed in an annular groove formed in a piston of an internal combustion engine, said spacer-expander having upper and lower sides and comprising a plurality of circumferentially spaced arms which slant axially and circumferentially, and a plurality of circumferentially extending members connecting said arms together, said connecting members being located alternately at the upper and lower sides of said spacer-expander, the upper and lower sides of said spacer-expander lying in generally parallel radial planes, and tabs formed at their radially inner ends on certain of said arms and being bent along lines from said arms to extend generally radially outward from said arms to terminate in radially outer ends, each of said radially extending tabs lying in a plane extending obliquely to said parallel radial planes and being wider at its said radially outer end than at its said radially inner end to provide upper and lower corners on said outer end thereof, said corners being spaced inwardly from said parallel radial planes, said circumferentially extending connecting members being adapted to engage the inner peripheries of said rails to force them outwardly and the upper and lower corners on said tabs being adapted to engage the inner sides of said rails to hold them axially spaced, and the bend line for each of said tabs slanting axially and circumferentially and at a different angle from the slant of said arms.

10. A spacer-expander as in claim 9, wherein the radially outer edge of each of said tabs extends substantially parallel to said bend line.

11. A spacer-expander for a piston ring assembly including a pair of annular rails, said assembly being adapted to be installed in an annular groove formed in a piston of an internal combustion engine, said spacer-expander comprising a generally cylindrical, circumferentially expansible spring structure extending circumferentially at the inner periphery of the spacer-expander, the upper and lower edges of said structure lying in generally parallel radial planes, and a plurality of tabs joined at their radially inner ends with said spring structure and extending radially outward from said spring structure to terminate in radially outer ends, each of said radially extending tabs lying in a plane extending obliquely to said parallel radial planes and being wider at its said radially outer end than at its said radially inner end to provide upper and lower corners on said outer end thereof, said corners being spaced inwardly from said parallel radial planes, said spring structure being adapted to engage the inner peripheries of said rails to force them outwardly and the upper and lower corners on said tabs being adapted to engage the inner sides of said rails to hold them axially spaced.

12. A spacer-expander as in claim 11, wherein said spacer-expander is formed from a strip of sheet metal, the upper and lower edges and the radially outer edge of each tab forming said corners with the respective faces of the strip.

References Cited by the Examiner
UNITED STATES PATENTS 2,676,076    4/1954    Hamm    277—139
3,140,096    7/1964    Rodenkirchen    277—141

FOREIGN PATENTS 1,123,357    6/1956    France.

LAVERNE D. GEIGER, *Primary Examiner.*

S. ROTHBERG, *Examiner.*

J. MEDNICK, L. J. RANEY, *Assistant Examiners.*